United States Patent
Yu et al.

(10) Patent No.: US 11,321,287 B2
(45) Date of Patent: May 3, 2022

(54) DATA NOISE REDUCTION METHOD, DEVICE, COMPUTER APPARATUS AND STORAGE MEDIUM

(71) Applicant: PING AN TECHNOLOGY (SHENZHEN) CO., LTD., Shenzhen (CN)

(72) Inventors: Xiuming Yu, Shenzhen (CN); Wei Wang, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 114 days.

(21) Appl. No.: 16/634,438

(22) PCT Filed: Dec. 24, 2018

(86) PCT No.: PCT/CN2018/123176
§ 371 (c)(1),
(2) Date: Jan. 27, 2020

(87) PCT Pub. No.: WO2020/056968
PCT Pub. Date: Mar. 26, 2020

(65) Prior Publication Data
US 2021/0232550 A1 Jul. 29, 2021

(30) Foreign Application Priority Data
Sep. 18, 2018 (CN) .......................... 201811088984.8

(51) Int. Cl.
*G06F 16/00* (2019.01)
*G06F 16/215* (2019.01)
(Continued)

(52) U.S. Cl.
CPC ........ *G06F 16/215* (2019.01); *G06F 11/3428* (2013.01); *G06F 16/2228* (2019.01); *G06F 16/23* (2019.01); *G06F 16/285* (2019.01)

(58) Field of Classification Search
None
See application file for complete search history.

(56) References Cited

FOREIGN PATENT DOCUMENTS

| CN | 105302854 A | 2/2016 |
|----|-------------|--------|
| CN | 105550257 A | 5/2016 |

(Continued)

OTHER PUBLICATIONS

International Search Report from International Application No. PCT/CN2018/123176 dated Jun. 18, 2019.

*Primary Examiner* — Bai D Vu
(74) *Attorney, Agent, or Firm* — Dorsey & Whitney LLP

(57) ABSTRACT

A data noise reduction method based on data resource. The method includes: acquiring a corresponding characteristic combination according to a received request for noise reduction; acquiring corresponding initial data according to the characteristic combination; calculating a discrimination degree of the characteristic combination; screening the discrimination degree of the characteristic combination using a preset initial discrimination degree threshold, and acquiring a characteristic combination corresponding to the discrimination degree that meets a preset requirement; generating an initial characteristic combination according to the corresponding characteristic combination; extracting an available characteristic combination from the initial characteristic combination according to a preset evaluation index; performing a noise reduction process to the initial data according to the available characteristic combination, deleting noise data from the initial data and acquires available data, and sending the available data to the terminal.

18 Claims, 5 Drawing Sheets

(51) Int. Cl.
*G06F 16/28* (2019.01)
*G06F 16/23* (2019.01)
*G06F 16/22* (2019.01)
*G06F 11/34* (2006.01)

(56) References Cited

FOREIGN PATENT DOCUMENTS

| | | | |
|---|---|---|---|
| CN | 107248161 A | 10/2017 | |
| EP | 3327669 A1 | 5/2018 | |

DATA NOISE REDUCTION METHOD, DEVICE, COMPUTER APPARATUS AND STORAGE MEDIUM

CROSS-REFERENCE TO RELATED APPLICATIONS

This application is a U.S. National Stage of PCT International Application No. PCT/CN2018/123176, filed on Dec. 24, 2018, which claims priority to Chinese Patent Application No. 201811088984.8, filed on Sep. 18, 2018 and entitled "DATA NOISE REDUCTION METHOD, DEVICE, COMPUTER APPARATUS AND STORAGE MEDIUM", the contents of which is expressly incorporated herein by reference in its entirety.

TECHNICAL FIELD

The present disclosure relates to a data noise reduction method, a device, a computer apparatus, and a storage medium.

BACKGROUND

With the development of data processing technology, the requirements for processing data by people have been becoming increased. In most cases, it is necessary to delete disturbance data including noise data from mass data while performing a statistics or analysis therefor. The process for data noise reduction may include various methods such as a mean filtering method, a median filtering method, a low-pass filtering method as well as a wavelet transformation method and a total variation method, etc. The key of the noise reduction is to acquire a noise distribution, decompose a signal according to different characteristics, find out a characteristic of the noise and inhibit it.

However, the inventor realized that in the conventional noise reduction processing, the decomposition of the signal and the extraction of the characteristic of noise typically involve complex mathematical operations which rely on expert's experience, and is prone to a situation that the level of the noise reduction is unstable, leading to take a lot of time and energy to perform repeated operations.

SUMMARY

According to various embodiments disclosed by the present disclosure, a data noise reduction method, a device, a computer apparatus, and a storage medium are provided A data noise reduction method includes:

receiving a request for noise reduction sent by a terminal, and acquiring a corresponding characteristic combination according to the request for noise reduction;

acquiring corresponding initial data according to the characteristic combination;

calculating a discrimination degree of the characteristic combination;

screening the discrimination degree of the characteristic combination using a preset initial discrimination degree threshold, and acquiring a characteristic combination corresponding to the discrimination degree that meets a preset requirement;

generating an initial characteristic combination according to the characteristic combination corresponding to the discrimination degree that meets the preset requirement;

extracting an available characteristic combination from the initial characteristic combination according to a preset evaluation index; and performing a noise reduction process to the initial data according to the available characteristic combination, deleting noise data from the initial data, and acquiring available data;

sending the available data to the terminal.

A data noise reduction device includes:

a reception module configured to receive a request for noise reduction sent by a terminal, and acquire a corresponding characteristic combination according to the request for noise reduction;

an initial data acquisition module configured to acquire corresponding initial data according to the characteristic combination;

a discrimination degree calculation module configured to calculate a discrimination degree of the characteristic combination;

a screening module configured to screen the discrimination degree of the characteristic combination using a preset initial discrimination degree threshold, and acquire a characteristic combination corresponding to the discrimination degree that meets a preset requirement;

an initial characteristic combination generation module configured to generate an initial characteristic combination according to the characteristic combination corresponding to the discrimination degree that meets the preset requirement;

an available characteristic combination extraction module configured to extract an available characteristic combination from the initial characteristic combination according to a preset evaluation index;

a noise reduction module configured to perform a noise reduction process to the initial data according to the available characteristic combination, delete noise data from the initial data, and acquire available data; and a sending module configured to send the available data to the terminal.

A computer apparatus includes one or more processors; and a memory storing instructions, which, when executed by the one or more processors cause the one or more processors to perform steps including:

receiving a request for noise reduction sent by a terminal, and acquiring a corresponding characteristic combination according to the request for noise reduction;

acquiring corresponding initial data according to the characteristic combination;

calculating a discrimination degree of the characteristic combination;

screening the discrimination degree of the characteristic combination using a preset initial discrimination degree threshold, and acquiring a characteristic combination corresponding to the discrimination degree that meets a preset requirement;

generating an initial characteristic combination according to the characteristic combination corresponding to the discrimination degree that meets the preset requirement;

extracting an available characteristic combination from the initial characteristic combination according to a preset evaluation index;

performing a noise reduction process to the initial data according to the available characteristic combination, deleting noise data from the initial data, and acquiring available data; and sending the available data to the terminal.

One or more non-transitory computer-readable storage medium store computer-readable instructions that, when executed by at least one processors, cause the at least one processor to perform steps including:

receiving a request for noise reduction sent by a terminal, and acquiring a corresponding characteristic combination according to the request for noise reduction;

acquiring corresponding initial data according to the characteristic combination;

calculating a discrimination degree of the characteristic combination;

screening the discrimination degree of the characteristic combination using a preset initial discrimination degree threshold, and acquiring a characteristic combination corresponding to the discrimination degree that meets a preset requirement;

generating an initial characteristic combination according to the characteristic combination corresponding to the discrimination degree that meets the preset requirement;

extracting an available characteristic combination from the initial characteristic combination according to a preset evaluation index;

performing a noise reduction process to the initial data according to the available characteristic combination, deleting noise data from the initial data, and acquiring available data; and sending the available data to the terminal.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention.

Figure 1:
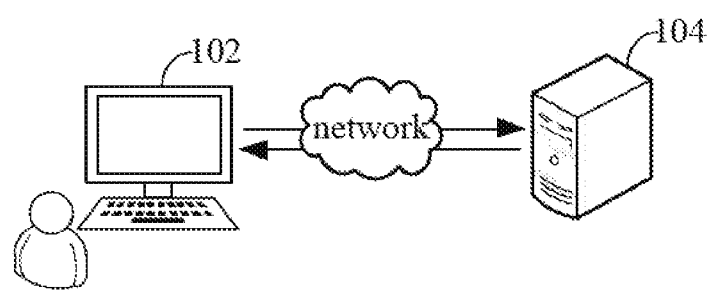
FIG. 1 is a schematic diagram illustrating an environment adapted for a data noise reduction method according to one or more embodiments.

A data noise reduction method provided by the present disclosure can be implemented in the environment shown in FIG. 1. A terminal 102 communicates with a server 104 through a network. The server 104 receives a request for noise reduction sent by the terminal 102, acquires a corresponding characteristic combination according to the request for noise reduction, and acquires corresponding initial data according to the characteristic combination. The server 104 calculates a discrimination degree of the characteristic combination, screens the discrimination degree of the characteristic combination using a preset initial discrimination degree threshold, and acquires a characteristic combination corresponding to the discrimination degree that meets a preset requirement. An initial characteristic combination is generated according to the characteristic combination corresponding to the discrimination degree that meets the preset requirement, and an available characteristic combination is extracted from the initial characteristic combination according to a preset evaluation index. A noise reduction process is performed to the initial data according to the available characteristic combination, noise data is deleted from the initial data and available data is acquired, and the available data is sent to the terminal 102. The terminal 102 may be, but is not limited to, various laptops, smartphones, tablets, and portable wearable devices, the server 104 can be implemented by an independent server or a server cluster consisting of a plurality of servers.

Figure 2:
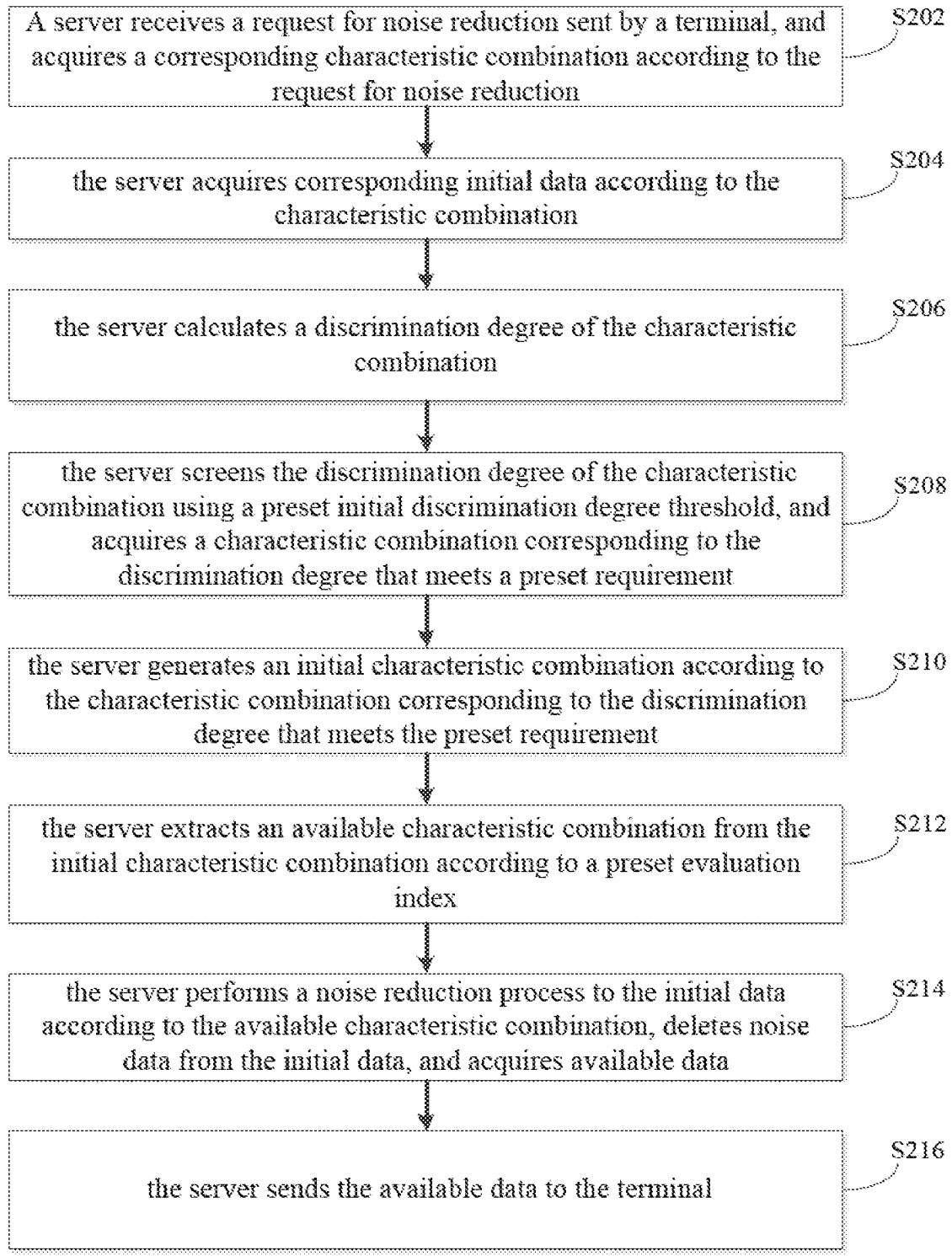
FIG. 2 is a schematic flow chart of the data noise reduction method according to one or more embodiments.

In an embodiment, as shown in FIG. 2, a data noise reduction method is provided. The method is illustrated by taking the method to apply to the server in FIG. 1 as an example and includes following steps.

At step S202, the server receives a request for noise reduction sent by a terminal, and acquires a corresponding characteristic combination according to the request for noise reduction.

Specifically, different requests for noise reduction correspond to different characteristic combinations, and a matching relationship exists between the request for noise reduction and the characteristic combination, therefore, the characteristic combination corresponding to the requests for noise reduction can be acquired according to the matching relationship between the request for noise reduction and the characteristic combination. The request for noise reduction carries a characteristic identification, and the server may acquire the characteristic combination corresponding to the characteristic identification according to a matching relationship between the preset characteristic identification and the characteristic combination. The characteristic may be an abstract result of the feature of a subject matter or a group of subject matters, which can be used to describe a concept. Any one of subject matters or the group of subject matters may have a plurality of features, and the common features of the subject matters can be abstracted into the characteristic. The characteristic combination represents a combination formed by a plurality of characteristics having correlation relationships, and the characteristic combination can be generated according to the preset correlation among the plurality of characteristics.

Taking image denoising as an example, digital images in reality are generally affected by a disturbance of a imaging device, an external environment noise and the like during a digitization and a transmission process, and the process of reducing the noise in the digital image is the image denoising. In the conventional art, a mean filter is typically used for the image denoising, and such mean filter using a neighborhood average method is adapted to delete a grain noise in the image obtained by scanning, thereby effectively inhibiting the noise, however at the same time, a fuzzy phenomenon occurs due to the mean, and the degree of fuzziness is directly proportional to the radius of the neighborhood.

In the present embodiment, with respect to the image denoising, the server receives the request for noise reduction sent by the terminal and parses the request for noise reduction; acquires the characteristic identification carried by the requests for noise reduction; acquires an image characteristic corresponding to the characteristic identification according to a matching relationship between the preset characteristic identification and the image characteristic; acquires a preset correlation among a plurality of image characteristics; and generates an image characteristic combination according to the correlation among the plurality of image characteristics.

At step S204, the server acquires corresponding initial data according to the characteristic combination.

Specifically, different characteristic combinations correspond to different raw data, and a matching relationship exists between the characteristic combination and the raw data, therefore, the server may acquire the raw data corresponding to the characteristic combination according to a matching relationship between a preset characteristic combination and the raw data. The raw data corresponding to the characteristic combination is processed according to a matching relationship between a preset characteristic combination and a processing manner to acquire the initial data. The processing manner includes screening, deleting, and adding. With respect to the different characteristic combination, the data process corresponding to the processing manner is performed according to the matching relationship between the characteristic combination and the processing manner.

Further, with respect to a matching relationship between a first characteristic combination and the screening operation, the raw data corresponding to the first characteristic combination is screened. The screening rule is a preset screening rule and includes rules of screening the data type of the raw data, and with respect to the data value threshold set by different data types, the server classifies the raw data by a preset data type according to the preset screening rule, deletes data that does not belong to the preset data type, screens the classified raw data by the data value threshold of the different data types, and extracts the raw data complying with the data value threshold corresponding to the respective data types, which is the initial data.

With respect to a matching relationship between the first characteristic combination and the deleting operation, the raw data corresponding to the first characteristic combination is deleted. The raw data to be deleted is the raw data that does not pass the screening rule, that is, the raw data that does not belong to the respective preset data type and exceeds the data value threshold corresponding to the respective preset data types.

With respect to a matching relationship between a second characteristic combination and the adding operation, the raw data corresponding to the second characteristic combination is verified. When the verification fails, the server preforms the adding operation and adds the raw data corresponding to the second characteristic combination. The verification performed by the server to the second characteristic combination is an integrity check. The server compares an amount of data of the current raw data with a preset minimum threshold of an amount of the raw data, when the amount of data of the current raw data is less than the preset minimum threshold of the amount of the raw data, it represents that the raw data corresponding to the second characteristic combination does not pass the integrity check, thus the adding operation needs to be performed.

At step S206, the server calculates a discrimination degree of the characteristic combination.

The discrimination degree is also called as a validity of project, which serves as a main basis for evaluating the quality of project and screening the project. The calculation of the discrimination degree is based on a relationship between a response of a subject to the project and a certain reference standard, and a value thereof is in a range of −1.00 to +1.00. In general, the discrimination degree should be a positive value, which is called a positive discrimination. The greater the value is, the better the discrimination degree is. If the discrimination degree is a negative value, it is called a negative discrimination.

Specifically, the server acquires characteristics included by different characteristic combinations, respectively, and calculates discrimination degrees of the different characteristic combinations, respectively according to a correlation among the characteristic, as well as a plurality of characteristics. Taking the image denoising as an example, different mage characteristic combinations are consisted of a plurality of image characteristics according to the respective correlations. The server calculates a discrimination degree corresponding to the image characteristic combinations by acquiring the image characteristics included by the image characteristic combinations as well as the correlation among the image characteristics and according to the acquired image characteristics, as well as the correlation among the image characteristics.

At step S208, the server screens the discrimination degree of the characteristic combination using a preset initial discrimination degree threshold, and acquires a characteristic combination corresponding to the discrimination degree that meets a preset requirement.

At step S210, the server generates an initial characteristic combination according to the characteristic combination corresponding to the discrimination degree that meets the preset requirement.

Specifically, the server acquires the preset initial discrimination degree threshold, compares the discrimination degree of the characteristic combination with the preset initial discrimination degree threshold, and acquires the characteristic combination corresponding to the discrimination degree that exceeds the preset initial discrimination degree threshold, that is, the characteristic combination corresponding to the discrimination degree that meets a preset requirement. The server generates the initial characteristic combination according to the characteristic combination corresponding to the discrimination degree that meets the preset requirement, that is, the characteristic combination corresponding to the discrimination degree that exceeds the preset initial discrimination degree threshold.

A typical index for the discrimination degree is D, which has a value in a range of −1 to 1, and the larger the value, the better the discrimination degree. The discrimination degree is acquired by comparing passing rates of the two groups of subjects with a high total score and a low total score. An applied equation is: $D=P_H-P_L$, wherein the $P_H$ is a passing rate of the group of the subject with the high total score on the project, the $P_L$ is a passing rate of the group of the subject with the high total score on the project, which are determined by calculating a correlation coefficient between the score of a certain project and a total score of test or a score of criterion. The larger the correlation coefficient is, the higher the discrimination degree is.

Specifically, the calculation method for the discrimination degree includes following two kinds: (1) a product-difference correlation method: it can be used to calculate the discrimination degree of the project when both the project and the total score of the test are scored using continuous scores. A variable x is used to represent a score of a student on a certain project, and variable y is used to represent a total score of the student on a test, and the product-difference correlation coefficient can represent the value of the discrimination degree of the project.

(2) a point biserial correlation method: its formula can be used to calculate the discrimination degree of the project when the project is scored by a dichotomy and the test result is represented by continuous scores.

Further, the initial discrimination degree threshold can be set as 0.5 according the value range of the index of the discrimination degree, then the server compares the preset initial discrimination degree threshold with the discrimination degree corresponding to the characteristic combination, and acquires the characteristic combination corresponding to the discrimination degree that exceeds the preset initial discrimination degree threshold of 0.5, and generates the initial characteristic combination according to the characteristic combination corresponding to the discrimination degree that exceeds the preset initial discrimination degree threshold of 0.5.

Taking an image denoising as an example, the server compares a calculated image characteristic combination with the preset initial discrimination degree threshold of 0.5, acquires the image characteristic combination corresponding to the discrimination degree that exceeds the preset initial discrimination degree threshold of 0.5, and generates an initial image characteristic combination.

At step S212, the server extracts an available characteristic combination from the initial characteristic combination according to a preset evaluation index.

Specifically, the server acquires the preset evaluation index and acquires a matching relationship between the preset evaluation index and the initial characteristic combination. The server screens the initial characteristic combination using the preset evaluation index according to the matching relationship between the preset evaluation index and the initial characteristic combination, acquires the initial characteristic combination complying with the preset evaluation index, and generates the available characteristic combination according to the acquired initial characteristic combination complying with the preset evaluation index.

The preset evaluation index includes an AUC value, a precision rate, and a recall rate. The AUC value is a size of an area under a sensitivity curve. The AUC value is called Area Under Curve, which is defined as an area under a ROC (receiver operating characteristic) curve and has a value in the range of 0.5 to 1. The ROC curve is the sensitivity curve on which respective points reflect same sensitivity, and all of the points are the results obtained under two kinds of different determination standards in response to the same signal stimulus. The subject operating characteristic curve is a curve drawn by a coordinate chart composed of a false positive probability as a horizontal axis and a true positive probability as a vertical axis, and by different results obtained under a specific stimulus situation of the subject using different determination standards.

The precision rate represents a ratio of a number of samples correctly classified by a classifier to a total number of samples for a given test data set, that is, a precision rate on the test data set when the lose function is 0 to 1 of loss. An equation can be expressed as: precision rate=a number of relevant files retrieved by a system/a total number of files retrieved by the system. The recall rate is a metric of a coverage area, and the metric has a plurality of positive examples and is divided into the plurality of positive examples. An equation can be expressed as: recall rate=a number of relevant files retrieved by the system/a total number of all relevant files of the system.

Further, the server acquires a matching relationship between the AUC value and the initial characteristic combination, screens the initial characteristic combination according to the preset AUC value, and acquires the initial characteristic combination complying with the preset AUC value. The server sets the AUC value as 0.8 according to a value range of the AUC value, screens the initial characteristic combination using the AUC value of 0.8, and acquires the initial characteristic combination complying with the AUC value. The server acquires a matching relationship between the precision rate and the initial characteristic combination, screens the initial characteristic combination according to the preset precision rate, and acquires the initial characteristic combination complying with the preset precision rate. The server acquires a matching relationship between the recall rate and the initial characteristic combination, screens the initial characteristic combination according to the preset recall rate, and acquires the initial characteristic combination complying with the preset recall rate. The server generates the available characteristic combination according to the initial characteristic combination complying with the AUC value, the precision rate, the recall rate of the preset evaluation index.

At step S214, the server performs a noise reduction process to the initial data according to the available characteristic combination, deletes noise data from the initial data, and acquires available data.

Specifically, the server acquires the updated initial data according to a preset capture cycle, and classifies the initial data by the data type according to a matching relationship between the preset data type and the initial data. The server performs the noise reduction process to the classified initial data using the available characteristic combination respectively, deletes the noise data from the initial data, and acquires the available data.

The data type includes a numeric type, a byte type, a text type, etc. The corresponding initial data includes numeric type initial data, byte type initial data, and text type initial data. The noise data represents meaningless data, which means there are errors or abnormalities in the data, that is, the data departing from a desirable value, and these data may lead to a disturbance to the data analysis. In recent, the meaning of the data has been extended to include all data that is difficult to be correctly understood and translated by the machine, such as an unstructured text. Any data that cannot be read and used by the source program, and no matter it has been received, stored or changed, is called the noise.

Further, the server can acquire the data type corresponding to the initial data according to the matching relationship between the preset data type and the initial data, and classify the different initial data according to the data type respectively. The server performs the noise reduction process to the classified initial data using the available characteristic combination respectively, deletes the noise data from the initial data, and acquires the available data.

At step S216, the server sends the available data to the terminal.

In the above-mentioned data noise reduction method, the server acquires the characteristic combination according to the received request for noise reduction, and calculates the discrimination degree of the characteristic combination. The server screens the discrimination degree of the characteristic combination using the preset initial discrimination degree threshold, and acquires the characteristic combination corresponding to the discrimination degree that meets the preset requirement. The server generates the initial characteristic combination according to the characteristic combination corresponding to the discrimination degree that meets the preset requirement, and extracts the available characteristic combination from the initial characteristic combination using the preset evaluation index. The server performs the noise reduction process to the acquired initial data according to the available characteristic combination, deletes the noise data, and generates the available data. The server can determine the available characteristic combination complying with the preset requirement according to the preset initial discrimination degree threshold, perform the noise reduction process to the initial data using the available characteristic combination, and acquire the available data. The noise reduction process is performed to the initial data on the basis of the discrimination degree, so as to avoid a situation of repeatedly performing the noise reduction process to the same initial data, solve a problem of consuming huge time and energy to repeatedly perform the noise reduction process due to an unstable noise reduction level in the conventional noise reduction process, and reduce the resource consumption.

Figure 3:
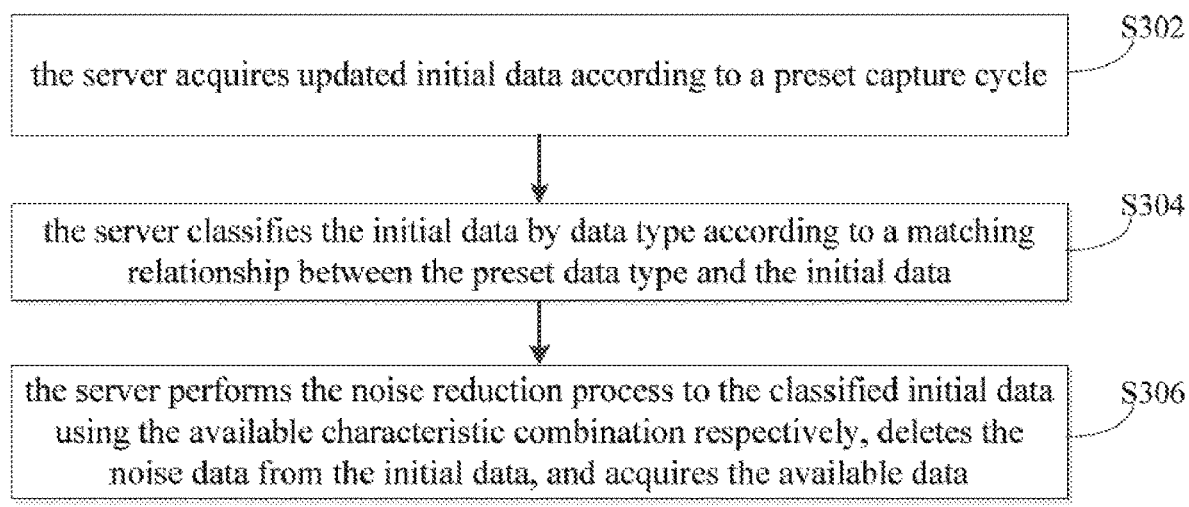
FIG. 3 is a schematic flow chart of performing a noise reduction process to initial data according to an available characteristic combination, deleting noise data from the initial data, and acquiring available data according to one or more embodiments.

In an embodiment, as shown in FIG. 3, a step of performing a noise reduction process to initial data according to an available characteristic combination, deleting noise data from the initial data, and acquiring available data is provided, which include:

At step S302, the server acquires updated initial data according to a preset capture cycle.

Specifically, the server set the preset capture cycle as 120 S (second). The server performs a capture of the initial data every 120 S, and the preset update cycle for the initial data can be set as 100 S, which is less than the preset capture cycle, so as to avoid the operation of capturing the initial data before the update operation is completed, and to realize the situation that the captured data is the updated initial data.

At step S304, the server classifies the initial data by data type according to a matching relationship between the preset data type and the initial data.

Specifically, different initial data correspond to different data types, and the data type includes a numeric type, a byte type, a text type, etc. The corresponding initial data includes numeric type initial data, byte type initial data, and text type initial data. The server classifies the initial data depending on the data type according to the matching relationship between the preset data type and the initial data, and the initial data can be classified into the numeric type initial data, the byte type initial data, and the text type initial data.

At step S306, the server performs the noise reduction process to the classified initial data using the available characteristic combination respectively, deletes the noise data from the initial data, and acquires the available data.

Specifically, with respect to initial data with different data types, different noise reduction process manners are performed. The data types include the numeric type, the byte type, the text type, etc. The corresponding noise reduction process manners are: a determination process manner, an assignment process manner, and a declaration process manner.

With respect to the numeric type initial data, the server performs the determination process: acquiring a preset value range, comparing the preset value range with a value of the numeric type initial data, determining that whether the value of the numeric type initial data complies with the preset value range, extracting the numeric type initial data complying with the preset value range, deleting noise data from the numeric type initial data, and generating numeric type available data. With respect to the byte type initial data, the server performs the assignment process: determining that whether a value of the byte type initial data complies with a preset value, assigning the preset value to the corresponding byte type initial data when the value of the byte type initial data does not comply with the preset value, deleting noise data from the assigned byte type initial data, and generating byte type available data. With respect to the text type initial data, the server performs the declaration process: acquiring a component of the text type initial data, comparing the component with a preset component, declaring the text type initial data as the preset component when the component of the text type initial data does not comply with the preset component, deleting noise data from the text type initial data, and generating text type available data.

The above-mentioned steps of performing the noise reduction process to initial data according to the available characteristic combination, deleting noise data from the initial data, and acquiring available data can acquire the available data by acquiring the updated initial data according to the preset capture cycle, classifying the initial data depending on the data type, performing the noise reduction process to the initial data in light of different data types, and deleting the noise data from the initial data. Since the noise reduction process is performed according to the data type, the noise data is deleted, the availability of data is improved and the data recourse is saved.

In an embodiment, a step of receiving a request for noise reduction sent by a terminal and acquiring a corresponding characteristic combination according to the request for noise reduction is provided, which includes: a server receives and parses the request for noise reduction sent by the terminal; acquires a characteristic corresponding to the request for noise reduction; acquire a correlation among preset characteristics, and generates the characteristic combination according to the correlation.

Specifically, different requests for noise reduction correspond to different characteristic combinations, and a matching relationship exists between the request for noise reduction and the characteristic combination, thus, the characteristic combination corresponding to the requests for noise reduction can be acquired according to the matching relationship between the request for noise reduction and the characteristic combination. The request for noise reduction carries a characteristic identification, and the server may acquire the characteristic combination corresponding to the characteristic identification according to a matching relationship between the preset characteristic identification and the characteristic combination.

In the present embodiment, with respect to an image denoising, the server receives the request for noise reduction sent by the terminal and parses the request for noise reduction; acquires the characteristic identification carried by the requests for noise reduction; acquires an image characteristic corresponding to the characteristic identification according to a matching relationship between the preset characteristic identification and the image characteristic; acquires a preset correlation among a plurality of image characteristics; and generates an image characteristic combination according to the correlation among the plurality of image characteristics.

The above-mentioned step of receiving the request for noise reduction sent by the terminal and acquiring the corresponding characteristic combination according to the request for noise reduction can realize a generation of characteristic combination according to the characteristics and the correlation among the respective characteristics, a rapid formation of the characteristic combination and an improved operation efficiency by acquiring the characteristics corresponding to the request for noise reduction and acquiring the correlation among preset characteristics.

In an embodiment, a step of screening the discrimination degree of the characteristic combination using a preset initial discrimination degree threshold and acquiring a characteristic combination corresponding to the discrimination degree that meets a preset requirement is provided, which includes:

The server acquires the preset initial discrimination degree threshold, compares the discrimination degree of the characteristic combination with the preset initial discrimination degree threshold, and acquires the characteristic combination corresponding to the discrimination degree that exceeds the preset initial discrimination degree threshold.

Specifically, the server acquires the preset initial discrimination degree threshold, compares the discrimination degree of the characteristic combination with the preset initial discrimination degree threshold, and acquires the characteristic combination corresponding to the discrimination degree that exceeds the preset initial discrimination degree threshold, that is, the characteristic combination corresponding to the discrimination degree that meets a preset requirement.

Further, the initial discrimination degree threshold can be set to 0.5 according the value range of the index of the discrimination degree, then the server compares the preset initial discrimination degree threshold with the discrimination degree corresponding to the characteristic combination, and acquires the characteristic combination corresponding to the discrimination degree that exceeds the preset initial discrimination degree threshold of 0.5, and generates the initial characteristic combination according to the characteristic combination corresponding to the discrimination degree that exceeds the preset initial discrimination degree threshold of 0.5.

The above-mentioned step of screening the discrimination degree of the characteristic combination using the preset initial discrimination degree threshold and acquiring the characteristic combination corresponding to the discrimination degree that meets the preset requirement can avoid performing next operation in which the characteristic combination does not meet the preset requirement, reduce redundant operations, and save resource by comparing the discrimination degree of the characteristic combination with the preset initial discrimination degree threshold and acquiring the characteristic combination corresponding to the discrimination degree that exceeds the preset initial discrimination degree threshold.

In an embodiment, a step of extracting an available characteristic combination from the initial characteristic combination according to a preset evaluation index is provided, which includes:

The server acquires the preset evaluation index; screens the initial characteristic combination using the preset evaluation index according to a matching relationship between the preset evaluation index and the initial characteristic combination; acquires the initial characteristic combination complying with the preset evaluation index, and generates the available characteristic combination according to the acquired initial characteristic combination complying with the preset evaluation index.

Specifically, the preset evaluation index includes an AUC value, a precision rate, and a recall rate. The AUC value is a size of an area under a sensitivity curve which is defined as an area under a ROC curve and has a value in the range of 0.5 to 1. The ROC curve is the sensitivity curve on which respective points reflect same sensitivity, and all of the points are the results obtained under two kinds of different determination standards in response to the same signal stimulus. The precision rate represents a ratio of a number of samples correctly classified by a classifier to a total number of samples for a given test data set. The recall rate is a metric of a coverage area, and the metric has a plurality of positive examples and is divided into the plurality of positive examples.

Further, the server generates the available characteristic combination according to the initial characteristic combination complying with the AUC value, the precision rate, the recall rate of the preset evaluation index.

The above-mentioned step of extracting the available characteristic combination from the initial characteristic combination according to the preset evaluation index can acquire the available characteristic combination complying with evaluation index by screening the initial characteristic combination using the preset evaluation index. The initial characteristic combination can be comprehensively screened according to the AUC value, the precision rate, the recall rate of the evaluation index, and the obtained available characteristic combination can be more complied with the preset requirement, and therefore, the operation efficiency is improved.

In an embodiment, a step of acquiring corresponding initial data according to the characteristic combination is provided, which includes:

The server acquires initial data according to the characteristic combination; performs a data process to raw data corresponding to the characteristic combination according to a matching relationship between a preset characteristic combination and a processing manner, and acquires the initial data.

Specifically, different characteristic combinations correspond to different raw data, and a matching relationship exists between the characteristic combination and the raw data, thus, the server may acquire the raw data corresponding to the characteristic combination according to a matching relationship between a preset characteristic combination and the raw data. The server performs a data process to the raw data corresponding to the characteristic combination according to a matching relationship between a preset characteristic combination and a processing manner, and acquires the initial data.

The processing manner includes a screening operation, a deleting operation and an adding operation. With respect to the different characteristic combination, the server performs the data process corresponding to the processing manner according to the matching relationship between the characteristic combination and the processing manner, and acquires the initial data.

In the above-mentioned step of acquiring corresponding initial data according to the characteristic combination, the raw data corresponding to the characteristic combination is data processed to obtain the initial data using the matching relationship between the characteristic combination and the processing manner, such that is can be ensured that the raw data corresponding to the characteristic combination is data processed according to the corresponding the processing manner, and the acquisition efficiency of the initial data is improved.

In an embodiment, a data noise reduction method is provided, which further includes:

The server acquires a correlation between a preset updated step size and the initial discrimination degree threshold; sets the updated step size corresponding to the initial discrimination degree threshold according to the correlation between the updated step size and the initial discrimination degree threshold; and updates the initial data within a preset update cycle using the updated step size.

Specifically, the updated step size represents a difference between two update time points, the server presets the correlation between the preset updated step size and the initial discrimination degree threshold; sets the updated step size corresponding to the initial discrimination degree threshold according to the correlation between the preset updated step size and the initial discrimination degree threshold; and updates the initial data within the preset update cycle using the updated step size.

Further, the updated step size corresponding to the initial discrimination degree threshold can be set to 60 S according to the preset correlation between the preset updated step size and the initial discrimination degree threshold, that is, the difference between two update time points is 60 S, and the preset update cycle is set to 150 S. The initial data is updated within the preset update cycle of 150 S using the updated step size of 60 S.

In the above-mentioned data noise reduction method, the server can set the updated step size corresponding to the initial discrimination degree threshold according to the correlation between the updated step size and the initial discrimination degree threshold and update the initial data within the preset update cycle using the updated step size, so as to ensure the timely update of the initial data, the acquired data is also the updated initial data, therefore, the operation efficiency is further improved.

It should be appreciated that, although each step in FIGS. 2 and 3 are shown in sequence according to the arrows, these steps are not executed definitely in the order indicated by the arrows. Unless expressly stated in the disclosure, there is no strict order limit to the execution of these steps, i.e., these steps can be executed in other order. Furthermore, at least a portion of the steps in FIGS. 2 and 3 may include multiple sub-steps or multiple stages. These sub-steps or stages are not definitely executed and finished at the same time, but executed at different times. These sub-steps or stages are not definitely executed in sequence, but can be executed by turns or alternately with other steps or at least a portion of the sub-steps or stages of other steps.

Figure 4:
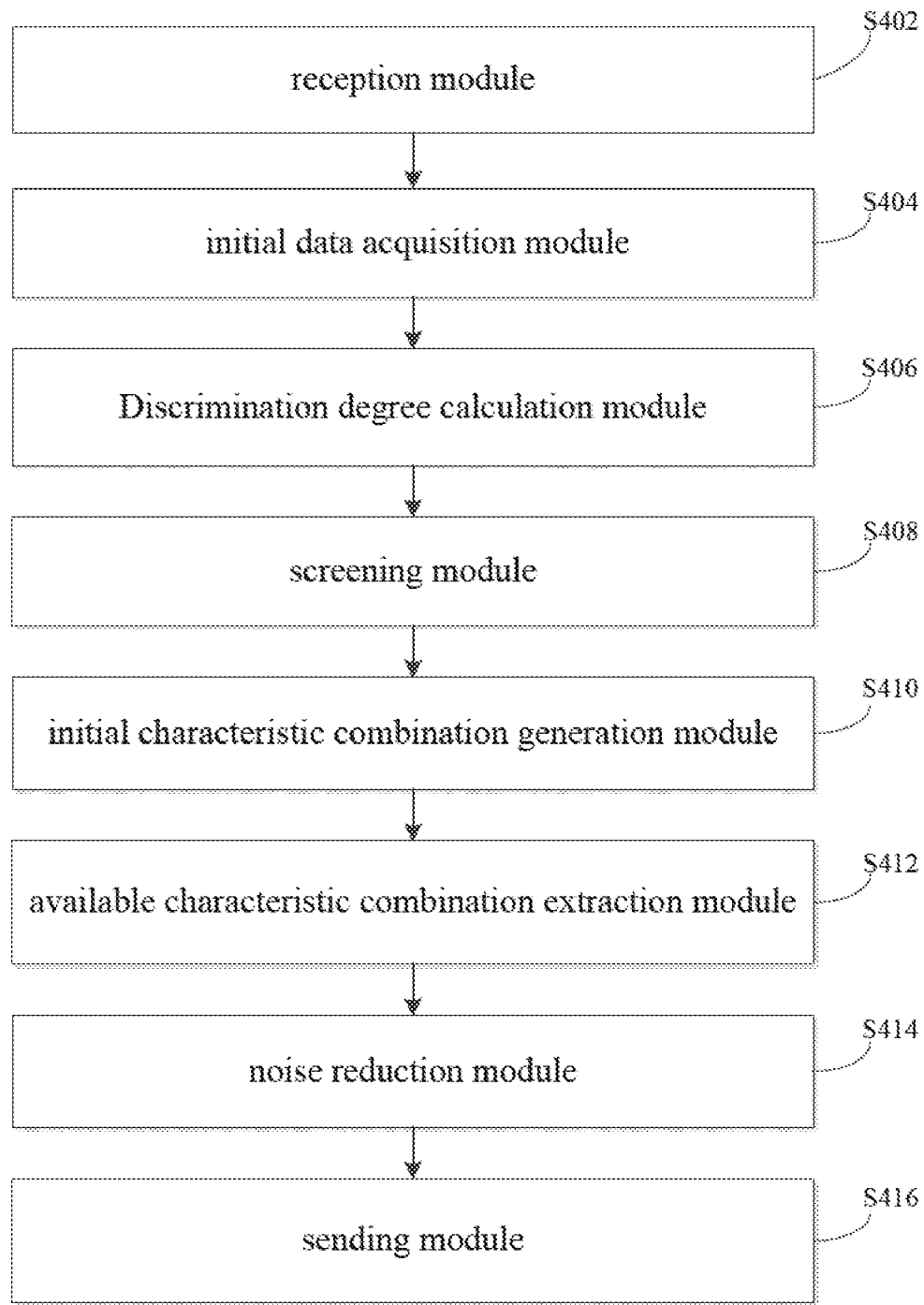
FIG. 4 is a block diagram of a data noise reduction device according to one or more embodiments.

In an embodiment, as shown in FIG. 4, a data noise reduction device is provided, which includes: a reception module 402, an initial data acquisition module 404, a discrimination degree calculation module 406, a screening module 408, an initial characteristic combination generation module 410, an available characteristic combination extraction module 412, a noise reduction module 414, and a sending module 416.

The reception module 402 is configured to receive a request for noise reduction sent by a terminal, and acquire a corresponding characteristic combination according to the request for noise reduction.

The initial data acquisition module 404 is configured to acquire corresponding initial data according to the characteristic combination.

The discrimination degree calculation module 406 is configured to calculate a discrimination degree of the characteristic combination.

The screening module 408 is configured to screen the discrimination degree of the characteristic combination using a preset initial discrimination degree threshold, and acquire a characteristic combination corresponding to the discrimination degree that meets a preset requirement.

The initial characteristic combination generation module 410 is configured to generate an initial characteristic combination according to the characteristic combination corresponding to the discrimination degree that meets the preset requirement.

The available characteristic combination extraction module 412 is configured to extract an available characteristic combination from the initial characteristic combination according to a preset evaluation index.

The noise reduction module 414 is configured to perform a noise reduction process to the initial data according to the available characteristic combination, delete noise data from the initial data, and acquire available data.

The sending module 416 is configured to send the available data to the terminal.

In the above-mentioned data noise reduction device, the server acquires the characteristic combination according to the received request for noise reduction, and calculates the discrimination degree of the characteristic combination. The discrimination degree of the characteristic combination using the preset initial discrimination degree threshold is screened, and the characteristic combination corresponding to the discrimination degree that meets the preset requirement is acquired. The initial characteristic combination according to the characteristic combination corresponding to the discrimination degree that meets the preset requirement is generated, and the available characteristic combination from the initial characteristic combination using the preset evaluation index is extracted. The noise reduction process to the acquired initial data according to the available characteristic combination is performed, the noise data is deleted, and the available data is generated. Therefore, the available characteristic combination complying with the preset requirement can be determined according to the preset initial discrimination degree threshold, the noise reduction process to the initial data can be performed using the available characteristic combination, and the available data can be acquired. The performing the noise reduction process to the initial data on the basis of the discrimination degree can avoid a situation of repeatedly performing the noise reduction process to the same initial data, solve a problem of consuming huge time and energy to repeatedly perform the noise reduction process due to an unstable noise reduction level in the conventional noise reduction process, and reduce the resource consumption.

In an embodiment, a reception module is provided, which is further configured to:

receive and parse the request for noise reduction sent by the terminal, and acquire a characteristic corresponding to the request for noise reduction; acquire a correlation among preset characteristics, and generate the characteristic combination according to the correlation.

The above-mentioned reception module can realize a generation of characteristic combination according to the characteristics and the correlation among the respective characteristics, a rapid formation of the characteristic combination and improved operation efficiency by acquiring the characteristics corresponding to the request for noise reduction and by acquiring the correlation among preset characteristics.

In an embodiment, an initial data acquisition module is provided, which is further configured to:

acquire initial data according to the characteristic combination; perform a data process to raw data corresponding to the characteristic combination according to a matching relationship between a preset characteristic combination and a processing manner, and acquire the initial data.

The above-mentioned initial data acquisition module can ensure the data process to the raw data corresponding to the characteristic combination in a corresponding processing manner, and improve the acquisition efficiency of the initial data by performing the data process to the raw data corresponding to characteristic combination using the matching relationship between the characteristic combination and a processing manner, and by acquiring the initial data.

In an embodiment, a screening module is provided, which is further configured to:

acquire the preset initial discrimination degree threshold, compare the discrimination degree of the characteristic combination with the preset initial discrimination degree threshold, and acquire the characteristic combination corresponding to the discrimination degree that exceeds the preset initial discrimination degree threshold.

The above-mentioned screening module can avoid performing next operation in which the characteristic combination does not comply with the preset requirement, reduce redundant operations, and save resource by comparing the discrimination degree of the characteristic combination with the preset initial discrimination degree threshold and by acquiring the characteristic combination corresponding to the discrimination degree that exceeds the preset initial discrimination degree threshold.

In an embodiment, an available characteristic combination extraction module is provided, which is further configured to:

acquire the preset evaluation index; screen the initial characteristic combination using the preset evaluation index according to a matching relationship between the preset evaluation index and the initial characteristic combination; acquire the initial characteristic combination complying with the preset evaluation index, and generate the available characteristic combination according to the acquired initial characteristic combination complying with the preset evaluation index.

The above-mentioned available characteristic combination extraction module can acquire the available characteristic combination complying with evaluation index by screening the initial characteristic combination using the preset evaluation index. The initial characteristic combination can be comprehensively screened according to the AUC value, the precision rate, the recall rate of the evaluation index, and the obtained available characteristic combination can be more complied with the preset requirement, and therefore, the operation efficiency is improved.

In an embodiment, a noise reduction module is provided, which is further configured to:

acquire the updated initial data according to the preset capture cycle, classify the initial data depending on the data type according to the matching relationship between the preset data type and initial data; perform the noise reduction process to the classified initial data using the available characteristic combination respectively, delete the noise data from the initial data, and acquire the available data.

The above-mentioned noise reduction module can acquire the available data by acquiring the updated initial data according to the preset capture cycle, classifying the initial data depending on the data type, performing the noise reduction process to the initial data in light of different data types, and deleting the noise data from the initial data. Since the noise reduction process is performed depending on the data type, the noise data is deleted, the availability of data is improved and the data recourse is saved.

In an embodiment, a data noise reduction device is provided, which further includes an update module which is configured to:

acquire a correlation between a preset updated step size and the initial discrimination degree threshold; set the updated step size corresponding to the initial discrimination degree threshold according to the correlation between the updated step size and the initial discrimination degree threshold; and update the initial data within a preset update cycle using the updated step size.

In the above-mentioned data noise reduction device can set the updated step size corresponding to the initial discrimination degree threshold according to the correlation between the updated step size and the initial discrimination degree threshold and update the initial data within the update cycle using the updated step size, so as to ensure the timely update of the initial data, and the acquired data is also the updated initial data, therefore, the operation efficiency is further improved.

Regarding the specific limitation of the data noise reduction device, the limitation of the data noise reduction method described in the above can be referenced to, which is not repeated herein. All or part of the modules in the above-mentioned data noise reduction device can be implemented through software, hardware or the combination thereof. Each of the above modules can be embedded into or independent of a processor in the computer apparatus in the form of hardware, or stored in the memory in the computer apparatus in the form of software, so that the processor can call and execute the operation corresponding to each module.

Figure 5:
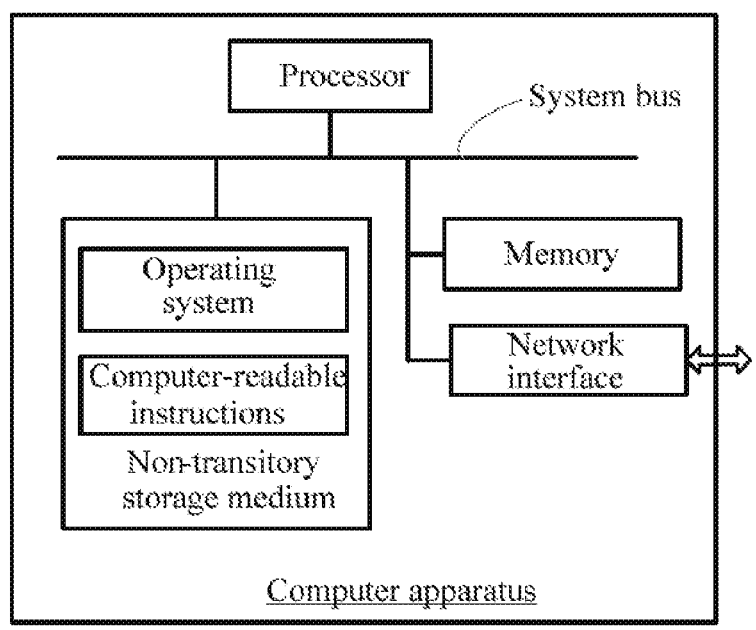
FIG. 5 is a block diagram of a computer apparatus according to one or more embodiments.

In an embodiment, a computer apparatus is provided, which may be a server, and a schematic diagram of the internal structure thereof may be as shown in FIG. 5. The computer apparatus includes a processor, a memory, a network interface and a database connected by a system bus. The processor of the computer apparatus is configured to provide calculation and control capabilities. The memory of the computer apparatus includes a computer-readable storage medium and a memory. The non-transitory computer-readable storage medium storage medium stores an operating system, computer-readable instructions and a database. The memory provides an environment for the operation of the operating system and the computer-readable instructions in the non-transitory computer-readable storage medium. The database of the computer apparatus is configured to store raw data. The network interface of the computer apparatus is configured to communicate with an external terminal via network connection. The computer-readable instructions are executed by the processor to implement a data noise reduction method.

Those skilled in the art will appreciate that the structure shown in FIG. 5 is merely a block diagram of a portion of the structure associated with the solution of the present disclosure, and does not constitute a limitation on the computer apparatus to which the solution of the present disclosure is applied, a particular computer apparatus may include more or less components, or combine certain components, or with a different arrangement of components.

A computer apparatus, which includes one or more processors and a storage which stores computer-readable instructions therein, the computer-readable instructions can implement the steps of a data preprocessing method for unbalanced samples provided by any one of embodiments of the present disclosure while being executed by the processor.

One or more non-transitory computer-readable storage medium stores computer-readable instructions that, when executed by at least one processors, cause the at least one processor to perform steps of a data preprocessing method for unbalanced samples provided by any one of embodiments of the present disclosure.

A person skilled in the art should understand that the processes of the methods in the above embodiments can be, in full or in part, implemented by computer-readable instructions instructing underlying hardware. The computer-readable instructions can be stored in a computer-readable storage medium and executed by at least one processor in the computer operating system. The computer-readable instructions can include the processes in the embodiments of the various methods when it is being executed. Any references to memory, storage, databases, or other media used in various embodiments provided herein may include non-transitory and/or transitory memory. Non-transitory memory can include read only memory (ROM), programmable ROM (PROM), electrically programmable ROM (EPROM), electrically erasable programmable ROM (EEPROM), or flash memory. Transitory memory may include random access memory (RAM) or external high-speed cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), synchronization chain Synchlink DRAM (SLDRAM), memory Bus (Rambus) direct RAM (RDRAM), direct memory bus dynamic RAM (DRDRAM), and memory bus dynamic RAM (RDRAM).

Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A data noise reduction method, comprising:
receiving a request for noise reduction sent by a terminal which communicates with a server through a network, and acquiring a corresponding characteristic combination according to the request for noise reduction;
acquiring corresponding initial data according to the characteristic combination;
calculating a discrimination degree of the characteristic combination;
screening the discrimination degree of the characteristic combination using a preset initial discrimination degree threshold, and acquiring a characteristic combination corresponding to the discrimination degree that meets a preset requirement;
generating an initial characteristic combination according to the characteristic combination corresponding to the discrimination degree that meets the preset requirement;
extracting an available characteristic combination from the initial characteristic combination according to a preset evaluation index;
performing a noise reduction process to the initial data according to the available characteristic combination, deleting noise data from the initial data, and acquiring available data; and
sending the available data to the terminal;
wherein the characteristic combination represents a combination formed by a plurality of characteristics having correlation relationships, and the characteristic combination can be generated according to the preset correlation among the plurality of characteristics; and different characteristic combinations correspond to different raw data, and a matching relationship exists between the characteristic combination and the raw data;
wherein the initial characteristic combination is a calculation result according to the characteristic combination; the server acquires the preset initial discrimination degree threshold, compares the discrimination degree of the characteristic combination with the preset initial discrimination degree threshold, and acquires the characteristic combination corresponding to the discrimination degree that exceeds the preset initial discrimination degree threshold, the characteristic combination corresponding to the discrimination degree that meets a preset requirement; the server generates the initial characteristic combination according to the characteristic combination corresponding to the discrimination degree that meets the preset requirement, the characteristic combination corresponding to the discrimination degree that exceeds the preset initial discrimination degree threshold;
wherein the available characteristic combination is a calculation result from the initial characteristic combination; the server acquires the preset evaluation index and acquires a matching relationship between the preset evaluation index and the initial characteristic combination; the server screens the initial characteristic combination using the preset evaluation index according to the matching relationship between the preset evaluation index and the initial characteristic combination, acquires the initial characteristic combination complying with the preset evaluation index, and generates the available characteristic combination according to the acquired initial characteristic combination complying with the preset evaluation index;
wherein the discrimination degree is also called as a validity of project, which serves as a main basis for evaluating the quality of project and screening the project; the calculation of the discrimination degree is based on a relationship between a response of a subject to the project and a certain reference standard, and a value thereof is in a range of −1.00 to +1.00;
wherein the noise data represents meaningless data, which means there are errors or abnormalities in the data, the data departing from a desirable value and the data including an unstructured text; any data that cannot be read and used by the source program is called the noise.

2. The data noise method of claim 1, wherein the receiving the request for noise reduction sent by the terminal, and acquiring the corresponding characteristic combination according to the request for noise reduction comprises:

receiving and parsing the request for noise reduction sent by the terminal, and acquiring a characteristic corresponding to the request for noise reduction; and acquiring a correlation among preset characteristics, and generating the characteristic combination according to the correlation.

3. The data noise method of claim 1, wherein the screening the discrimination degree of the characteristic combination using the preset initial discrimination degree threshold, and acquiring the characteristic combination corresponding to the discrimination degree that meets the preset requirement comprises:

acquiring the preset initial discrimination degree threshold;

comparing the discrimination degree of the characteristic combination with the preset initial discrimination degree threshold; and acquiring the characteristic combination corresponding to the discrimination degree that exceeds the preset initial discrimination degree threshold.

4. The data noise method of claim 1, wherein the extracting the available characteristic combination from the initial characteristic combination according to the preset evaluation index comprises:

acquiring the preset evaluation index;

screening the initial characteristic combination using the preset evaluation index according to a matching relationship between the preset evaluation index and the initial characteristic combination; and acquiring the initial characteristic combination complying with the preset evaluation index, and generating the available characteristic combination according to the acquired initial characteristic combination complying with the preset evaluation index.

5. The data noise method of claim 1, wherein the performing the noise reduction process to the initial data according to the available characteristic combination, deleting the noise data from the initial data, and acquiring the available data comprises:

acquiring updated initial data according to a preset capture cycle;

classifying the initial data by data type according to a matching relationship between the preset data type and the initial data; and performing the noise reduction process to the classified initial data using the available characteristic combination respectively, deleting the noise data from the initial data, and acquiring the available data.

6. The data noise method of claim 1, wherein the acquiring the corresponding initial data according to the characteristic combination comprises:

acquiring raw data corresponding to the characteristic combination;

performing a data process to the raw data corresponding to the characteristic combination according to a matching relationship between a preset characteristic combination and a processing manner, and acquiring the initial data.

7. The data noise method of claim 1, further comprising:
acquiring a correlation between a preset updated step size and the initial discrimination degree threshold;

setting a updated step size corresponding to the initial discrimination degree threshold according to the correlation between the updated step size and the initial discrimination degree threshold; and updating the initial data within a preset update cycle using the updated step size.

8. A computer apparatus, comprising one or more processors; and a memory storing instructions, which, when executed by the one or more processors cause the one or more processors to perform steps comprising:

receiving a request for noise reduction sent by a terminal which communicates with a server through a network, and acquiring a corresponding characteristic combination according to the request for noise reduction;

acquiring corresponding initial data according to the characteristic combination;

calculating a discrimination degree of the characteristic combination;

screening the discrimination degree of the characteristic combination using a preset initial discrimination degree threshold, and acquiring a characteristic combination corresponding to the discrimination degree that meets a preset requirement;

generating an initial characteristic combination according to the characteristic combination corresponding to the discrimination degree that meets the preset requirement;

extracting an available characteristic combination from the initial characteristic combination according to a preset evaluation index;

performing a noise reduction process to the initial data according to the available characteristic combination, deleting noise data from the initial data, and acquiring available data; and sending the available data to the terminal;

wherein the characteristic combination represents a combination formed by a plurality of characteristics having correlation relationships, and the characteristic combination can be generated according to the preset correlation among the plurality of characteristics; and different characteristic combinations correspond to different raw data, and a matching relationship exists between the characteristic combination and the raw data;

wherein the initial characteristic combination is a calculation result according to the characteristic combination; the server acquires the preset initial discrimination degree threshold, compares the discrimination degree of the characteristic combination with the preset initial discrimination degree threshold, and acquires the characteristic combination corresponding to the discrimination degree that exceeds the preset initial discrimination degree threshold, the characteristic combination corresponding to the discrimination degree that meets a preset requirement; the server generates the initial characteristic combination according to the characteristic combination corresponding to the discrimination degree that meets the preset requirement, the characteristic combination corresponding to the discrimination degree that exceeds the preset initial discrimination degree threshold;

wherein the available characteristic combination is a calculation result from the initial characteristic combination; the server acquires the preset evaluation index and acquires a matching relationship between the preset evaluation index and the initial characteristic combination; the server screens the initial characteristic combination using the preset evaluation index according to the matching relationship between the preset evaluation index and the initial characteristic combination, acquires the initial characteristic combination complying with the preset evaluation index, and generates the available characteristic combination according to the acquired initial characteristic combination complying with the preset evaluation index;

wherein the discrimination degree is also called as a validity of project, which serves as a main basis for evaluating the quality of project and screening the project; the calculation of the discrimination degree is based on a relationship between a response of a subject to the project and a certain reference standard, and a value thereof is in a range of −1.00 to +1.00;

wherein the noise data represents meaningless data, which means there are errors or abnormalities in the data, the data departing from a desirable value and the data including an unstructured text; any data that cannot be read and used by the source program is called the noise.

9. The computer apparatus of claim 8, wherein the one or more processors further execute following steps when the computer-readable instructions are executed:
receiving and parsing the request for noise reduction sent by the terminal, and acquiring a characteristic corresponding to the request for noise reduction; and
acquiring a correlation among preset characteristics, and generating the characteristic combination according to the correlation.

10. The computer apparatus of claim 8, wherein the one or more processors further execute following steps when the computer-readable instructions are executed:
acquiring the preset initial discrimination degree threshold;
comparing the discrimination degree of the characteristic combination with the preset initial discrimination degree threshold; and
acquiring the characteristic combination corresponding to the discrimination degree that exceeds the preset initial discrimination degree threshold.

11. The computer apparatus of claim 8, wherein the one or more processors further execute following steps when the computer-readable instructions are executed:
acquiring the preset evaluation index;
screening the initial characteristic combination using the preset evaluation index according to a matching relationship between the preset evaluation index and the initial characteristic combination; and
acquiring the initial characteristic combination complying with the preset evaluation index, and generating the available characteristic combination according to the acquired initial characteristic combination complying with the preset evaluation index.

12. The computer apparatus of claim 8, wherein the one or more processors further execute following steps when the computer-readable instructions are executed:
acquiring updated initial data according to a preset capture cycle;
classifying the initial data by data type according to a matching relationship between the preset data type and the initial data; and
performing the noise reduction process to the classified initial data using the available characteristic combination respectively, deleting the noise data from the initial data, and acquiring the available data.

13. The computer apparatus of claim 8, wherein the one or more processors further execute following steps when the computer-readable instructions are executed:
acquiring raw data corresponding to the characteristic combination;
performing a data process to the raw data corresponding to the characteristic combination according to a matching relationship between a preset characteristic combination and a processing manner, and acquiring the initial data.

14. One or more non-transitory computer-readable storage medium storing computer-readable instructions that, when executed by at least one processors, cause the at least one processor to perform steps comprising:
receiving a request for noise reduction sent by a terminal which communicates with a server through a network, and acquiring a corresponding characteristic combination according to the request for noise reduction;
acquiring corresponding initial data according to the characteristic combination;
calculating a discrimination degree of the characteristic combination;
screening the discrimination degree of the characteristic combination using a preset initial discrimination degree threshold, and acquiring a characteristic combination corresponding to the discrimination degree that meets a preset requirement;
generating an initial characteristic combination according to the characteristic combination corresponding to the discrimination degree that meets the preset requirement;
extracting an available characteristic combination from the initial characteristic combination according to a preset evaluation index;
performing a noise reduction process to the initial data according to the available characteristic combination, deleting noise data from the initial data, and acquiring available data; and
sending the available data to the terminal;
wherein the characteristic combination represents a combination formed by a plurality of characteristics having correlation relationships, and the characteristic combination can be generated according to the preset correlation among the plurality of characteristics; and different characteristic combinations correspond to different raw data, and a matching relationship exists between the characteristic combination and the raw data;
wherein the initial characteristic combination is a calculation result according to the characteristic combination; the server acquires the preset initial discrimination degree threshold, compares the discrimination degree of the characteristic combination with the preset initial discrimination degree threshold, and acquires the characteristic combination corresponding to the discrimination degree that exceeds the preset initial discrimination degree threshold, the characteristic combination corresponding to the discrimination degree that meets a preset requirement; the server generates the initial characteristic combination according to the characteristic combination corresponding to the discrimination degree that meets the preset requirement, the characteristic combination corresponding to the discrimination degree that exceeds the preset initial discrimination degree threshold;
wherein the available characteristic combination is a calculation result from the initial characteristic combination; the server acquires the preset evaluation index and acquires a matching relationship between the preset evaluation index and the initial characteristic combination; the server screens the initial characteristic combination using the preset evaluation index according to the matching relationship between the preset evaluation index and the initial characteristic combination, acquires the initial characteristic combination complying with the preset evaluation index, and generates the available characteristic combination according to the acquired initial characteristic combination complying with the preset evaluation index;

wherein the discrimination degree is also called as a validity of project, which serves as a main basis for evaluating the quality of project and screening the project; the calculation of the discrimination degree is based on a relationship between a response of a subject to the project and a certain reference standard, and a value thereof is in a range of −1.00 to +1.00;

wherein the noise data represents meaningless data, which means there are errors or abnormalities in the data, the data departing from a desirable value and the data including an unstructured text; any data that cannot be read and used by the source program is called the noise.

15. The storage medium of claim 14, wherein the one or more processors further execute following steps when the computer-readable instructions are executed:

receiving and parsing the request for noise reduction sent by the terminal, and acquiring a characteristic corresponding to the request for noise reduction; and acquiring a correlation among preset characteristics, and generating the characteristic combination according to the correlation.

16. The storage medium of claim 14, wherein the one or more processors further execute following steps when the computer-readable instructions are executed:

acquiring the preset initial discrimination degree threshold;

comparing the discrimination degree of the characteristic combination with the preset initial discrimination degree threshold; and acquiring the characteristic combination corresponding to the discrimination degree that exceeds the preset initial discrimination degree threshold.

17. The storage medium of claim 14, wherein the one or more processors further execute following steps when the computer-readable instructions are executed:

acquiring the preset evaluation index;

screening the initial characteristic combination using the preset evaluation index according to a matching relationship between the preset evaluation index and the initial characteristic combination; and acquiring the initial characteristic combination complying with the preset evaluation index, and generating the available characteristic combination according to the acquired initial characteristic combination complying with the preset evaluation index.

18. The storage medium of claim 14 wherein the one or more processors further execute following steps when the computer-readable instructions are executed:

acquiring updated initial data according to a preset capture cycle;

classifying the initial data by data type according to a matching relationship between the preset data type and the initial data; and performing the noise reduction process to the classified initial data using the available characteristic combination respectively, deleting the noise data from the initial data, and acquiring the available data.

* * * * *